US007363848B2

(12) United States Patent
Hoch

(10) Patent No.: US 7,363,848 B2
(45) Date of Patent: Apr. 29, 2008

(54) ROTATING OR PIVOTING DEVICE AND CONNECTION MODULE FOR A ROTATING OR PIVOTING DEVICE

(75) Inventor: Andreas Hoch, Talheim (DE)

(73) Assignee: Schunk GmbH & Co. KG Fabrik fuer Spann-und Greifwerkzeuge, Lauffen am Neckar (*) Notice: Subject to any disclaimer, the term of this patent is extended or adjusted under 35 U.S.C. 154(b) by 407 days.

(21) Appl. No.: 10/548,388

(22) PCT Filed: Apr. 13, 2004

(86) PCT No.: PCT/EP2004/003896

§ 371 (c)(1),
(2), (4) Date: Sep. 8, 2005

(87) PCT Pub. No.: WO2004/090341

PCT Pub. Date: Oct. 21, 2004

(65) Prior Publication Data

US 2006/0165478 A1 Jul. 27, 2006

(30) Foreign Application Priority Data

Apr. 11, 2003 (DE) ................................ 103 17 281

(51) Int. Cl.
*F15B 15/08* (2006.01)
*F16K 31/12* (2006.01)

(52) U.S. Cl. ............................................ 92/23; 92/136

(58) Field of Classification Search ................. 92/13.6, 92/15, 23, 24, 25, 136, 138
See application file for complete search history.

(56) References Cited

U.S. PATENT DOCUMENTS

| | | | | |
|---|---|---|---|---|
| 2,935,051 | A * | 5/1960 | Fuller et al. | 92/136 |
| 3,019,771 | A * | 2/1962 | Heese et al. | 92/136 |
| 3,148,595 | A | 9/1964 | Looney | |
| 3,591,127 | A * | 7/1971 | Luger et al. | 251/36 |

(Continued)

FOREIGN PATENT DOCUMENTS

| | | |
|---|---|---|
| DE | 866 757 | 2/1953 |
| DE | 195 32 035 | 4/1996 |
| EP | 1 039 147 | 9/2000 |
| FR | 2 708 687 | 2/1995 |

*Primary Examiner*—Thomas E. Lazo
(74) *Attorney, Agent, or Firm*—Paul Vincent

(57) ABSTRACT

The invention relates to a rotating or pivoting device (110) comprising a housing (12), at least one working piston (14) which is mounted in the housing and subjected to a pressure medium, and a pivoting part (20) which is rotatably mounted in the housing and is rotatably driven by the working piston by means of a rotating coupling mechanism, the working piston being mounted in the housing in such a way that it can be displaced in a housing-side cylinder, The inventive rotating or pivoting device also comprises an abutment part (114) that limits the stroke of the working cylinder in at least two positions and can be locked at least in its axially inner intermediate position. The abutment part is provided with a locking piston (120) that is mounted in such a way that it can be axially displaced, and, when the abutment part is in its intermediate position, can be displaced against a spring element (122) in a pressurised manner into a locking position, and, in the locking position, activates locking part (128) for locking the abutment part (114).

17 Claims, 4 Drawing Sheets

U.S. PATENT DOCUMENTS 4,586,425 A * 5/1986 Redman et al. ................ 92/24
4,635,536 A * 1/1987 Liu et al. ...................... 92/24
5,385,218 A * 1/1995 Migliori ...................... 92/136
6,371,439 B1 * 4/2002 Trevisan ..................... 92/13.8

* cited by examiner

ROTATING OR PIVOTING DEVICE AND CONNECTION MODULE FOR A ROTATING OR PIVOTING DEVICE

This application is the national stage of PCT/EP2004/003896 filed on Apr. 13, 2004 and also claims Paris Convention priority of DE 103 17 281.5 filed on Apr. 11, 2003.

BACKGROUND OF THE INVENTION

The invention concerns a rotating or pivoting device comprising a housing, with at least one working piston which is disposed in the housing and can be loaded by a pressure medium, and a pivoting part which is rotatably mounted in the housing and is rotatably driven by the working piston via a rotating coupling mechanism, wherein the working piston is displaceably mounted in a cylinder on the side of the housing and comprises an abutment part which limits the stroke of the working cylinder in at least two positions and can be locked at least in its axially inner intermediate position. The stroke of the working piston and thereby the angle of rotation of the pivoting part are changed depending on the position of the abutment part. The invention also concerns a connection module for a device of this type.

Rotating or pivoting devices are disclosed e.g. in DE 33 06 480 C2, wherein the working piston cannot be displaced into an intermediate position.

In a conventional pivoting unit (SF 100 M D4/6, Sommer Automatic GmbH & Co. KG, D-75334), the abutment parts, so-called stopper pistons, are locked in the respective intermediate position using a slider which engages into the piston rod of the respective stopper piston from a radially outer direction, transverse to the longitudinal axis of the stopper piston. An intermediate position is assumed in the axially inner locked position. When the working piston moves against the abutment part in this intermediate position, the pivoting part is pivoted only into one intermediate position. After release of the locking, the working piston moves into its initial position. The pivoting part also moves into its initial position.

It is the underlying purpose of the present invention to propose a rotating or pivoting device providing simple locking of the abutment part. In particular, the construction of the inventive rotating or pivoting device should be compact and permit reliable locking.

This object is achieved by a rotating or pivoting device, wherein the abutment part comprises an axially displaceably disposed locking piston which, being subjected to pressure against spring means in the intermediate position of the abutment part, can be displaced into a locking position in which it activates the locking means for locking the abutment part. The rotating or pivoting device has a very compact construction since the abutment part comprises the locking piston. Locking is effected only when the locking piston activates the locking means in the intermediate position of the abutment part in response to being subjected to pressure in opposition to the spring means.

Locking balls, locking pins or the like may e.g. be used as locking means.

SUMMARY OF THE INVENTION

This object is achieved by a rotating or pivoting device having the features of the independent claim. The rotating or pivoting device has a very compact construction since the abutment part comprises the locking piston. Locking is effected only when the locking piston activates the locking means in the intermediate position of the abutment part in response to being subjected to pressure in opposition to the spring means.

It is thereby advantageous if, upon pressurization of the pressure chamber, the abutment part is initially moved in the direction of the respective working piston until it abuts against an abutment on the side of the housing, and subsequently loading the locking piston against the spring element and moving it into its locking position. With constant pressure in the pressure chamber, only the abutment part is thereby initially moved into the intermediate position followed by movement of the locking piston into the locking position.

In a further advantageous embodiment of the invention, the abutment part has openings for receiving the locking means, wherein, when the locking position has been reached, the locking means are loaded by the locking piston and are forced to move in a radially outer direction into locking receptacles on the side of the housing, thereby activating the locking means. The geometries of the openings, of the locking means and locking receptacles are designed such that, in the locking position, the forces exerted by the respective working piston in an axial direction on the respective abutment part are diverted via the locking means into the locking receptacles on the side of the housing and thereby directly or indirectly into the housing to ensure reliable locking.

In accordance with the invention, the locking piston may also have receptacles for the locking means and inclined guiding surfaces following the receptacles for forced guidance of the locking means upon reaching the locking position. The locking means are urged in a radial outer direction into the locking receptacles on the side of the housing via the defined inclined guiding surfaces.

In an advantageous embodiment of the invention, the locked intermediate position is maintained as long as the pressure chamber is pressurized and when the pressure chamber is pressure-relieved, the locking piston is displaced in an axial outer direction via the spring means thereby moving the locking balls into the receptacles on the side of the locking piston. In this unlocked position, the abutment part including locking piston and locking means, are moved in an axial outer direction through displacement of the working piston against the abutment part, until the abutment part has reached its initial position, thereby pivoting the pivoting part into its initial position. It is thereby advantageous that the abutment part can be returned through pressure-relieving the pressure chamber even if an axial load is exerted by the respective working piston.

In a further particularly preferred embodiment of the invention, the sleeve including abutment part, locking piston, spring means and locking means are housed in a connection module disposed on the free end face of the cylinder. The connection module preferably comprises its own additional housing which can be mounted to the actual housing. If pivoting of the pivoting part into an intermediate position is not desired, the connection module can be removed without impairing the function of the device. Moreover, certain rotating or pivoting properties of the device can be realized depending on the design of the connection module.

The connection module or the sleeve of the connection module advantageously comprises an outer or inner thread for screwing onto the free end of the cylinder tube. Alternatively, the free end face of the at least one cylinder has an outer and/or inner thread for screwing on the sleeve. In this manner, the connection module can be easily screwed and unscrewed.

To prevent undesired adjustment of the connection module, the invention may provide fastening means on the connection module and/or on the housing to fix the connection module in a predeterminable axial position.

In a further preferred embodiment of the invention, the at least one cylinder is designed as a cylinder tube which can be fixed to the housing. This is advantageous in that the cylinder tube can be provided as a separate component with extremely precise inner dimensions. Cylinder tubes of this type are easy to handle and operate. The inner surfaces on which the working piston abuts can be realized with high precision, thereby ensuring long service life and a pivoting device which operates with high precision.

In accordance with the invention, the at least one cylinder tube may advantageously be designed such that it can be screwed into the housing via a thread to permit replacement of the cylinder tube. The cylinder tube can be replaced in case of wear and the service life of the rotating and pivoting device can be increased without having to work on the housing.

A further embodiment of the invention is characterized in that the working piston can be loaded with pressure via two pressure sides. The cylinder tube may thereby extend over at least both pressure sides. The cylinder tube preferably extends at least over the length of the working piston and its piston stroke. Provision of only one cylinder tube is advantageous in that both pressure sides of the working piston are guided in the same cylinder tube in an exact axial direction.

It is, however, also feasible to displaceably dispose each pressure side of the piston in a separately formed cylinder tube. In this case, the two cylinder tubes, which are advantageously identical, are disposed along an axis. This design is advantageous in that the region between the two pressure sides of the piston is accessible, e.g. to realize a rotating coupling mechanism.

The rotating coupling mechanism is preferably designed to comprise a coupling section of the type of a pinion rod on the side of the piston, and a pinion on the side of the pivoting part which mates with the coupling section. The coupling section of working pistons which can be pressurized from both sides, is preferably disposed between the two pressure sides. A different type of rotating coupling mechanism, e.g. a frictional coupling, is also possible in accordance with the invention instead of a pinion-rod-type coupling section with associated pinion.

The connection module advantageously comprises means for screwing and/or unscrewing the connection module. Such means may e.g. be hexagon socket sections, hexagon head sections, handrails for manual operation or the like, which thereby ensure simple and fast adjustment or screwing and/or unscrewing of the connection module.

Further advantageous details and embodiments of the invention can be extracted from the following description which describes and explains the invention in more detail with reference to the embodiments shown in the drawing.

DESCRIPTION OF THE PREFERRED EMBODIMENT

Figure 1:
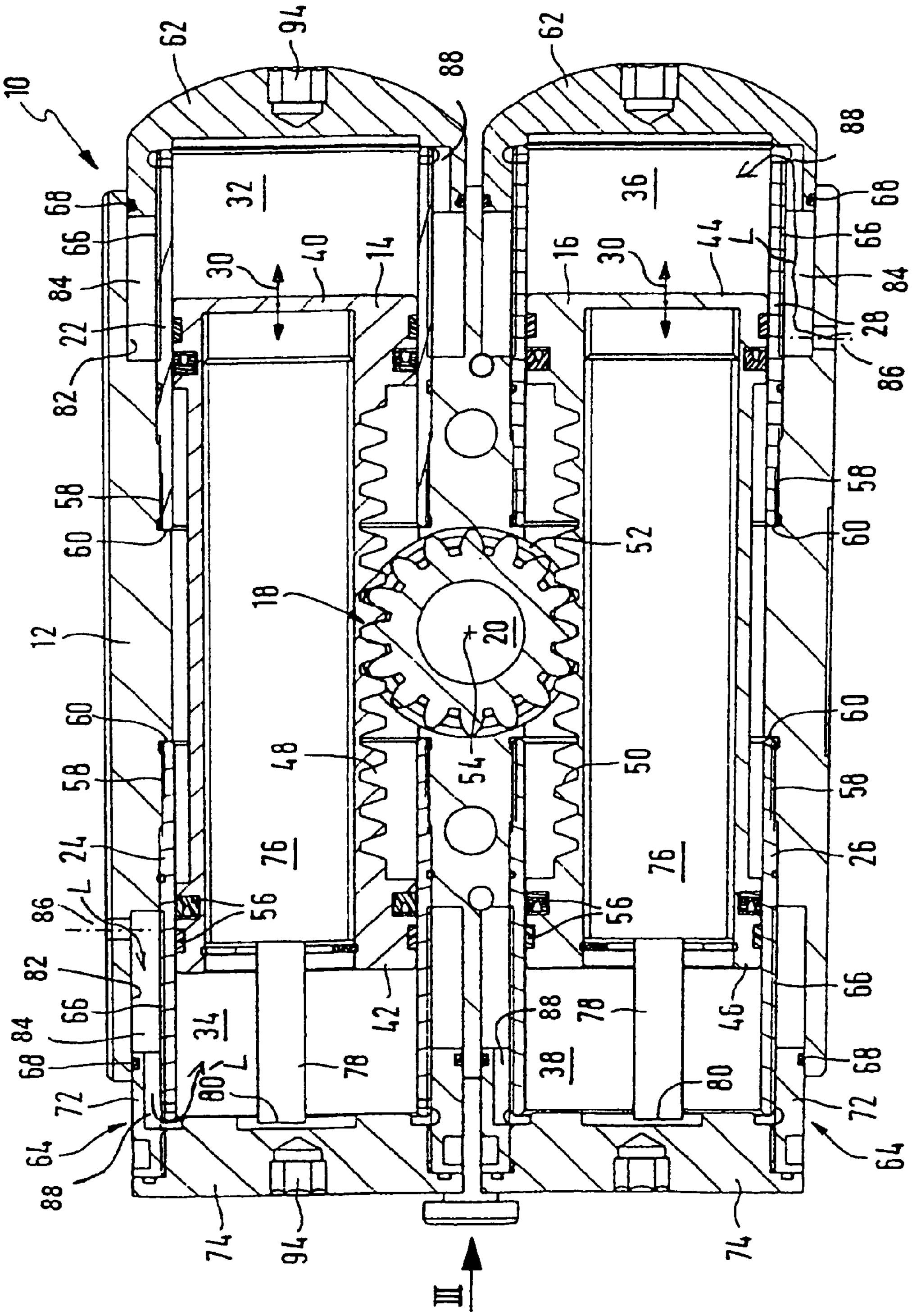
FIG. 1 shows a longitudinal section through a first embodiment of a pivoting device.

The pivoting device 10 shown in FIG. 1 comprises a housing 12 which accommodates two working pistons 14, 16 which can be displaced in a longitudinal direction. The working pistons 14, 16 are rotatably coupled to a pivoting part 20 via a rotating coupling mechanism 18. The two working pistons 14, 16 are disposed in cylinder tubes 22, 24, 26, 28 at the sides of the housing in such a manner that they can be displaced in a longitudinal direction along their longitudinal axis in the direction of the double arrows 30. The two working pistons 14, 16 of the embodiment shown are each designed to be pressurized from two sides. Towards this end, pressure chambers 32, 34 and 36, 38 are provided. The pressure chambers can be connected to pressure storages or pressure outlets via feed and discharge lines (not shown).

On the sides facing each other, the working pistons 14, 16 comprise a coupling section 48 and 50 designed like a piston rod and disposed between their respective pressure sides 40, 42, 44, 46. The two sections 48, 50 mate with a pinion 52 on the pivoting part side which is disposed to be rotatable about the pivot axis 54 of the pivoting part 20 or the pinion 52. In this view, the rotating coupling mechanism 18 of this design causes pivoting of the pivoting part 20 in a counter clockwise direction upon loading of the pressure chambers 32 and/or 38. The pivoting part 20 is pivoted in the clockwise direction upon pressurization of the pressure chambers 34 and/or 36.

The cylinder tubes 22, 24, 26, 28 are designed such that the surfaces of the working pistons are reliably guided in the cylinder tubes during maximum strokes of the working pistons 16, 18. The working pistons 14, 16 have corresponding sealing elements 56 in the region of their pressure sides 40, 42, 44, 46. Instead of providing four separate cylinder tubes 22, 24, 26, 28, each working piston 14, 16 may be disposed in one continuous cylinder tube in an axially displaceable manner. However, openings must be provided in the cylinder tubes in the region of the pinion 52 to permit rotating coupling of the pinion 52 with the corresponding coupling sections 48, 50. It is clear that different rotating coupling mechanisms may be provided instead of the illustrated toothed rack/pinion rotating coupling mechanism, e.g. a non-positive, frictional coupling.

The individual cylinder tubes 22, 24, 26, 28 have outer threads 58 on their sides facing the housing for screwing into the housing 12. For exact axial arrangement of the cylinder tubes, the housing 12 comprises abutment edges 60 against which the respective end faces of the cylinder tubes 22, 24, 26, 28 abut in their finally mounted position. Cylinder tubes can be replaced if required by providing threads 58.

Since the cylinder tubes are subjected to wear during operation of the pivoting device 10, only the faulty cylinder tube needs to be replaced in the inventive pivoting device. The other components of the pivoting device, in particular the housing 12, can be reused.

Two connection modules 62, 64 are provided on each free outer end face of the cylinder tubes. The connection modules 62 are cover parts for closing the cylinder tubes 22, 28 and can be screwed onto the free end faces of the cylinder tubes 22, 28. Towards this end, the cover parts 62 have an inner thread and the cylinder tubes 22, 28 have an outer thread 66.

The connection modules 64 are each formed from two parts and have a sleeve 72 and a closing part 74 which is screwed to the sleeve 72. The connection module 64 may also be a component formed from one part. The inner side of the closing part 74 serves as an abutment for the pressure sides 42 or 46 of the working pistons 14 or 16. To damp the impact, the respective working pistons 14, 16 comprise damping means 76 which comprise an abutment rod 78 which is disposed for damped displacement in the axial direction relative to the respective working piston 14, 16. The free end 80 of the respective abutment rod 78 consequently abuts the inside of the closing part 74 and damps the working piston 14, 16 which moves in the direction of the respective closing part 74.

The connection modules 64 can be screwed, at different depths, into outer threads 66 provided on the respective cylinder tubes 24, 28 via corresponding threads, wherein the stroke of the respective working piston 14, 16 and therefore the angle of rotation of the pivoting part 20 can be changed via the screwing-in depth of the connection modules 64.

On their respectively radial outer side, the connection modules 62, 64 or the sleeves 72 and the cover parts 64 have a circumferential groove with a sealing ring 68. The sealing rings 68 have a sealing effect on radially inner cylinder surfaces 82 of the housing 12 which extend in an axial direction. The cylinder surfaces 82 and the sleeves 72 or the cover parts 62 define air guiding chambers 84 which can be connected to pressure lines (not shown) via connections 86. The respective inner side of the connection modules 62, 64, which extends in an axial direction, has at least one recess 88 for guiding air to the respective pressure chambers 32, 34, 36, 38, the recess(es) extending to the respective cylinder tube end face facing the connection module 62, 64. The recesses 88 may be formed, in particular, as axial grooves. The recesses 88 may comprise additional recesses which extend in a radial direction on the cylinder tube end faces.

To pressurize or pressure-relieve the pressure chambers 32, 34, 36, 38, air can consequently flow in the direction of arrow L from the connections 86 into the respective pressure chamber 32, 34, 36, 38 via the air guiding chambers 84 and respective recess 88. Reliable air guidance is ensured in the described arrangement irrespective of the screwing-in depth of the respective connection module 62, 64. Moreover, the position of the connections 86 on the housing side is the same for different screwing-in depths.

Figure 2:
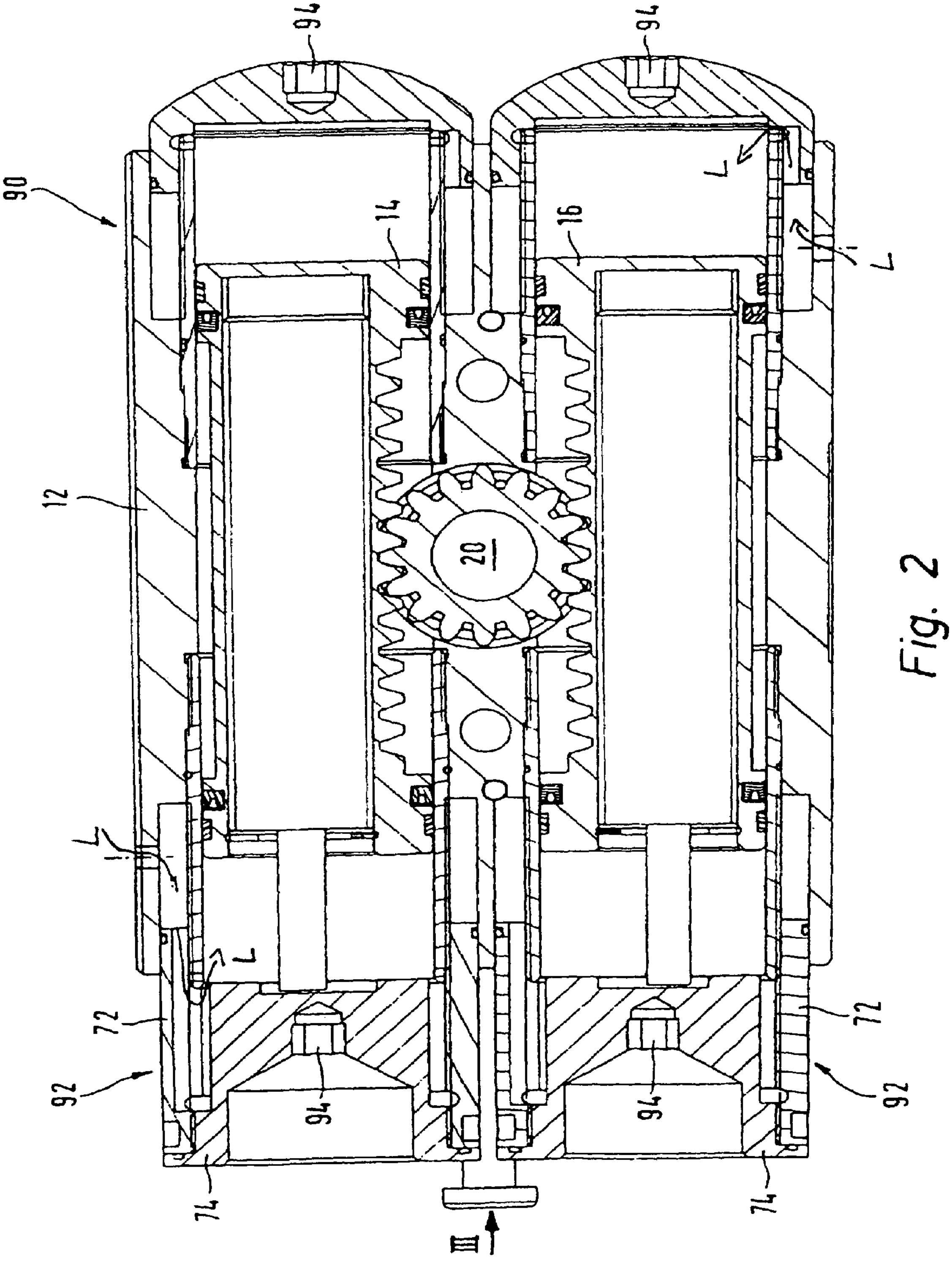
FIG. 2 shows a longitudinal section through a second embodiment of a pivoting device.

The pivoting device 90 shown in FIG. 2 substantially corresponds to the pivoting device 10 of FIG. 1. Corresponding components have corresponding reference numerals. In contrast to the pivoting device 10 of FIG. 1, which merely permits relatively small axial adjustment of the connection modules 64, the pivoting device 90 of FIG. 2 has connection modules 92 with sleeves 72 extending relatively far in the axial direction, which permits variation of the pivot angle of the pivoting part 20 within a larger region. In particular, the connection modules 92 can limit the stroke of the working pistons 14, 16 to a larger degree than the connection modules 64 of the pivoting device 10 of FIG. 1 due to the relatively long extension of the closing parts 74 in the direction of the housing 12. Depending on the screwing-in depth of the connection modules 92, the pivot angle of the pivoting part 20 can consequently be changed within a relatively large range. To permit simple and easy adjustment of the pivot ranges, the connection modules 62, 64 and 92 have screwing-on or unscrewing means in the form of a hexagonal socket 94.

Figure 3:
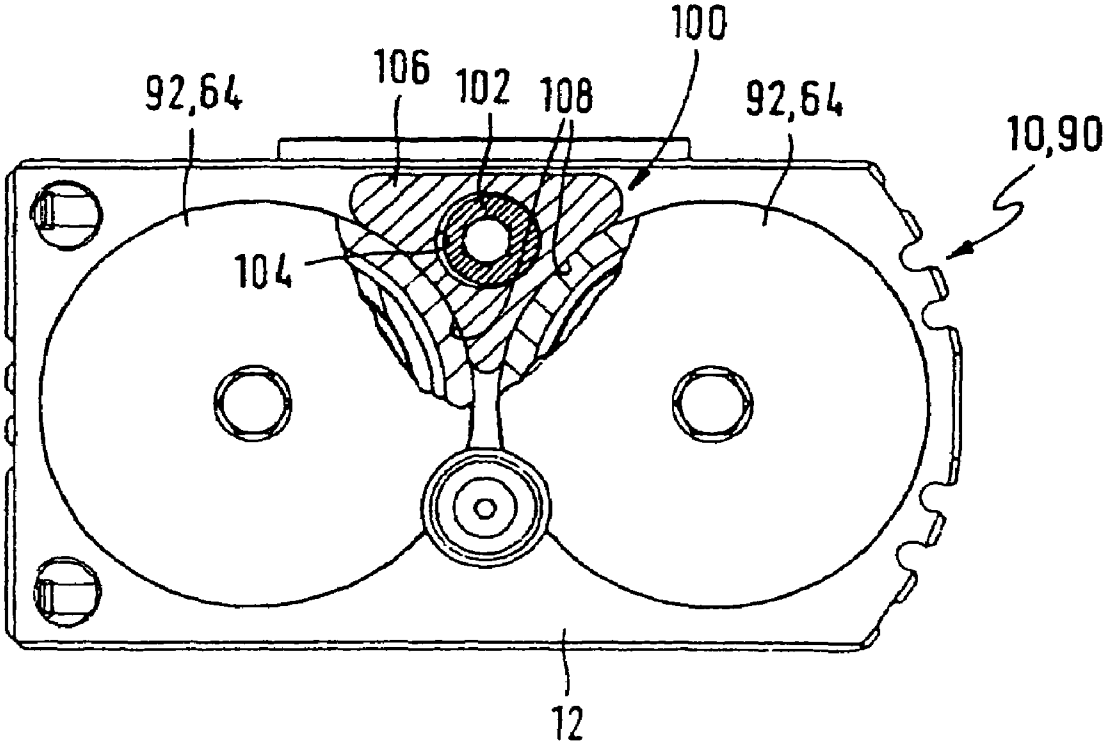
FIG. 3 shows a front view of the pivoting device in accordance with FIG. 1 or FIG. 2.

FIG. 3 shows a view in the direction of the arrow III onto the pivoting device 10 in accordance with FIG. 1 or the pivoting device 90 in accordance with FIG. 2. This view shows means 100 for fixing the connection modules 64 or 92 in their axial position. The fixing means 100 comprise a fixing pin 102 which is retained in the housing 12 and designed like a screw bolt comprising an eccentric head and a clamping part 106 which is penetrated by the fixing pin 102. The eccentric head of the fixing pin 102 is thereby seated in a cylindrical recess 104 in the clamping part 106. The clamping part 106 has two clamping surfaces 108 which abut against the respective surfaces of the connection modules 64, 92. When the fixing pin 102 is turned, the clamping part 106 is clamped between the two connection modules 64, 92 by the eccentric head. The eccentric head of the fixing pin 102 thereby acts against the wall of the cylindrical recess 104 of the clamping part 106 to fix the connection modules 64, 92 via the clamping surfaces 108. To release fixing, the fixing pin 102 is turned through 90° or 180°. The connection modules 64, 92 are thereby fixed in a simple and yet very effective manner.

To retain the fixing pin 102 in an axial direction, the fixing pin may have a radial circumferential groove into which a retaining pin engages that extends transversely to the longitudinal axis of the fixing pin 102 in such a manner that the fixing pin 102 is held such that it can be rotated but not displaced in its axial direction.

Figure 4:
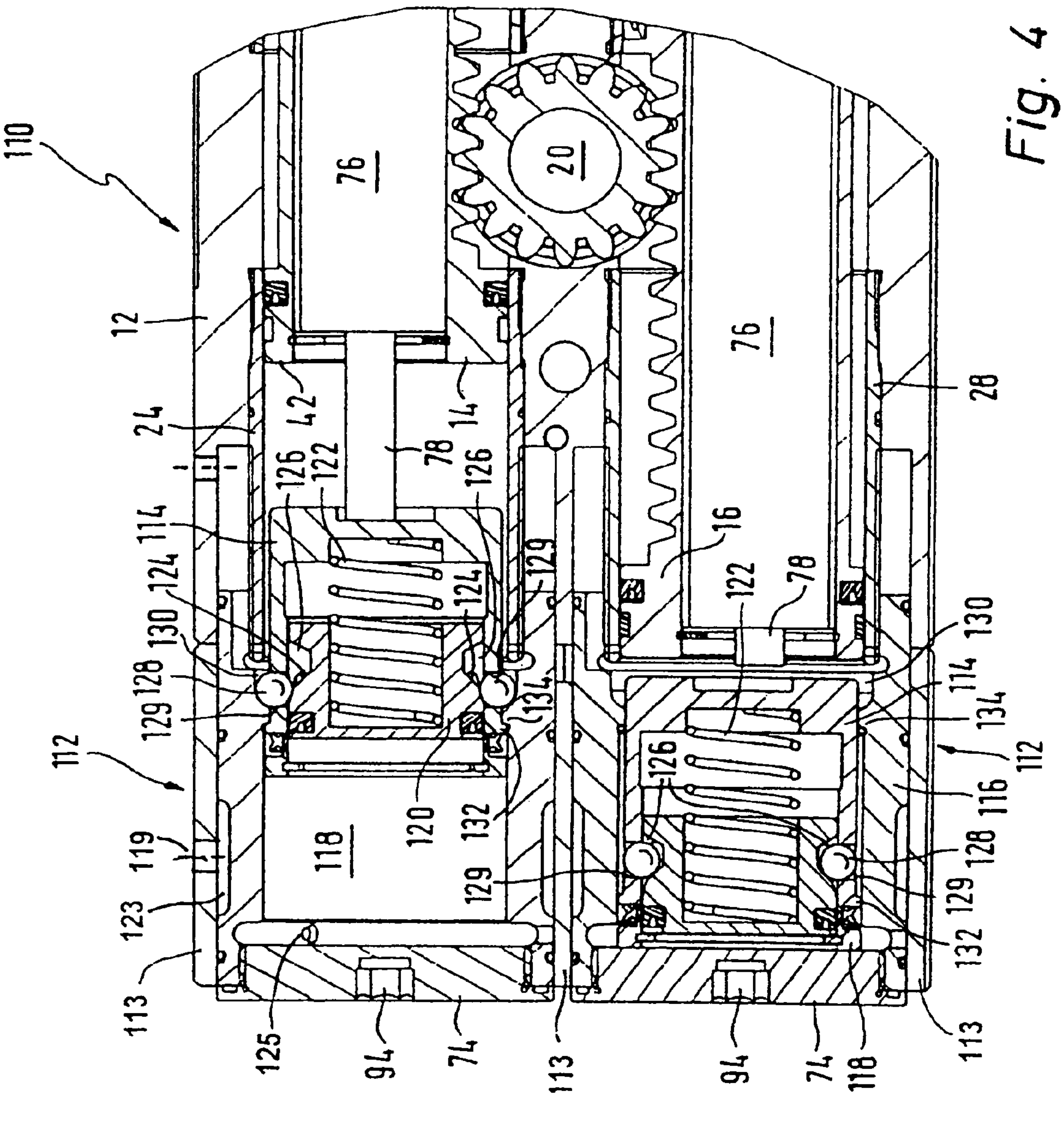
FIG. 4 shows a partial longitudinal section through a third embodiment of a pivoting device.

The pivoting device 110 of FIG. 4 comprises a housing 12 corresponding to the pivoting devices 10 and 90 with corresponding components which have reference numerals corresponding to the pivoting devices 10, 90 of FIGS. 1 and 2. The free end faces of the cylinder tubes 24, 28 of the pivoting device 10 comprise connection modules 112, each having one abutment part 114 which can be displaced to two positions and can be locked in its axially inner position. The working pistons 14, 16 and therefore the pivoting part 20 can thereby be moved to a predetermined intermediate position. The abutment part 114 facing the pressure side 42 is thereby in the locked intermediate position.

The connection modules 112 each have a sleeve 116 accommodated in a common additional housing 113, in which the piston-like abutment part 114 is disposed in an axially displaceable manner. Towards this end, a pressure chamber 118 is provided on the side of the abutment part 114 facing away from the respective working piston 14, 16. The pressure chamber 118 is pressurized or pressure-relieved via a pressure connection 119. The air is thereby guided into or out of the pressure chamber 118 via a radially outer circumferential annular groove 123 on the respective sleeve 116 and via openings which are connected to the groove 123 and, in particular, have the form of bores 125.

Upon pressurization of the pressure chamber 118, the abutment part 114 is moved into the intermediate position. Towards this end, the abutment part 114 moves towards the respective working piston 14, 16 until its collar-like abutment 132 strikes against an abutment 134 on the sleeve side. Due to pressurization of the pressure chamber 118, a locking piston 120 which is disposed to be axially displaceable on the inner side of the abutment part 114 is moved against the spring force of a pressure spring 122 towards the respectively associated working piston 14, 16. The locking piston 120 has inclined guiding surfaces 124 which adjoin a receptacle 126 for locking balls 128. In the initial position, the locking balls 128 are partially disposed in the receptacles 126 and partially in openings 129 extending in a radial direction and provided on the abutment part 114. The wall of the regions of the abutment part 114 surrounding the openings 129 thereby have approximately half the ball diameter.

Preferably several locking balls 128 disposed at equal separations from each other are provided over the periphery of the abutment part.

Upon displacement into the locking position, the balls 128 are forced from their receptacles 126 via the inclined guiding surfaces 124 in a radial outer direction into locking receptacles 130 provided on the inner side of the sleeve 116. The locking receptacles 130 extend in radial directions approximately by half a ball diameter. The locking receptacles 130 can either be formed as individual receptacles or as one single circumferential, groove-like receptacle.

The geometries of the receptacles 126, the locking balls 128, the openings 129 and the locking receptacles 130 are designed such that, in the locked intermediate position, axial forces exerted by the respective working piston 14, 16 or by the damping means 76 on the respective abutment part 114 are diverted via the locking balls 128 into the sleeve 116 and from the sleeve via screw connections between the sleeve and the housing 12, to the housing 12.

The locked intermediate position is maintained until the pressure chamber 118 is pressurized. If the pressure chamber 118 is pressure-free, the locking piston 120 is initially displaced in an axial outer direction via the pressure spring 122. The locking balls 128 thereby drop into the receptacles 126. Through movement of the working piston 14, 16 against the abutment part 114, the abutment part 114 including locking piston 120 and locking balls 128 are carried along in an axial outward direction until the abutment part 114 has reached its initial position followed by pivoting of the pivoting part 20 into the initial position.

In consequence thereof, the intermediate position can advantageously be activated or deactivated through pressurization or pressure-relieve of the pressure chamber 118. One particular advantage of the described embodiment is that return of the abutment part 114 is possible even under axial loads through releasing the pressure in the pressure chamber 114.

The described pivoting devices 10, 90 and 110 permit flexible use since they all comprise identical housings 12 or identical cylinder tubes. Depending on the application of the pivoting devices, corresponding connection modules 62, 64, 92 or 112 may be provided. The connection modules can be exchanged with little expense and using simple tools.

All the features shown in the description, the claims and the drawing may be essential to the invention either individually as well as in arbitrary combination.

I claim:

1. Rotating or pivoting device comprising:

a housing;

at least one working piston disposed in said housing;

means for loading said working piston with a pressurized medium;

a pivoting member mounted for rotation in said housing;

a coupling mechanism cooperating with said working piston and said pivoting member to enable said working piston to rotatably drive said pivoting member;

a cylinder mounted in said housing, said working piston being displaceably mounted in said cylinder;

abutment means cooperating with said housing and with said working piston to limit a stroke of said working piston at at least two positions;

means for locking said abutment means, independent of said working piston, in at least an axially inner, intermediate position;

an axially displaceable locking piston cooperating with and mounted within said abutment means;

spring means cooperating with said locking piston; and means for loading said locking piston with pressure in opposition to said spring means and in said intermediate position of said abutment means to displace said locking piston to lock said abutment means in a locking position thereof.

2. The device of claim 1, wherein said abutment means, said locking piston, and said working piston are displaceable along an axis or are coaxially disposed with respect to each other.

3. The device of claim 1, wherein said locking piston is displaceable within a sleeve of said housing.

4. The device of claim 3, wherein said sleeve, said abutment means, said locking piston, said spring means, and said locking means are all disposed in a connection module housing positioned at a free end face of said cylinder.

5. The device of claim 4, wherein said sleeve has an outer and/or inner thread for screwing to said housing or to said cylinder.

6. The device of claim 4, further comprising fixing means disposed on said connection module housing and/or on said housing for fixing said sleeve at a predeterminable axial position.

7. The device of claim 1, wherein said spring means is disposed between said abutment means and said locking piston.

8. The device of claim 1, wherein a pressure chamber is provided on a side of said abutment means facing away from a respective said working piston for moving said abutment means into said intermediate position and for pressing said locking piston into said locking position.

9. The device of claim 8, wherein upon pressurization of said pressure chamber, said abutment means is initially moved towards a respective said working piston until it abuts against a housing abutment, wherein said locking piston is subsequently loaded against said spring means and moved into said locking position.

10. A connection module for the rotating or pivoting device of claim 9, the module structured for attachment to a free end of said cylinder.

11. The device of claim 1, wherein said abutment means has openings for receiving said locking means, wherein, upon reaching said locking position, said locking means are loaded by said locking piston and are forced in a radially outer direction into locking receptacles in said housing.

12. The device of claim 11, wherein said locking piston has piston receptacles for said locking means and inclined guiding surfaces, which adjoin said piston receptacles for forced guidance of said locking means when said locking position has been reached.

13. The device of claim 12, wherein said locked intermediate position is maintained as long as a pressure chamber, is pressurized and, upon pressure relief of said pressure chamber said locking piston is displaced in an axially outward direction by said spring means, thereby moving said locking means into said piston receptacles.

14. The device of claim 1, wherein at least one said cylinder is designed as a cylinder tube which can be fixed to said housing.

15. The device of claim 14, wherein said at least one cylinder tube is designed to be screwed into said housing via a thread.

16. The device of claim 1, wherein said working piston can be pressurized at two pressure sides.

17. The device of claim 1, wherein said coupling mechanism comprises a rack type coupling section on a piston side, and a pinion on a pivoting member side.

* * * * *